Nov. 29, 1927.
P. McLOUGHLIN
1,650,802
SNAP HOOK
Filed April 18, 1927
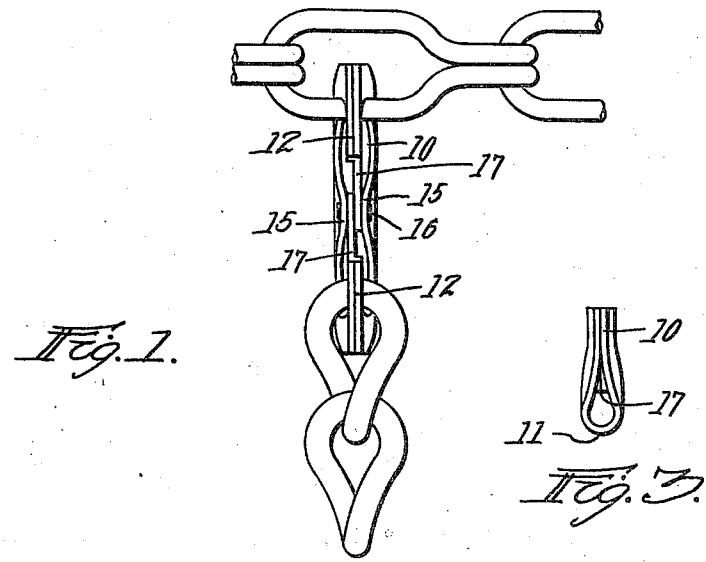
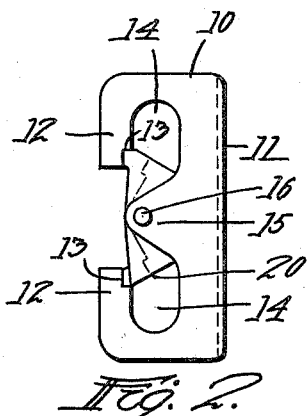
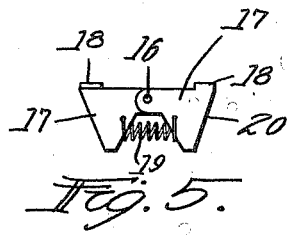
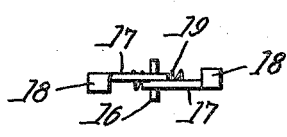
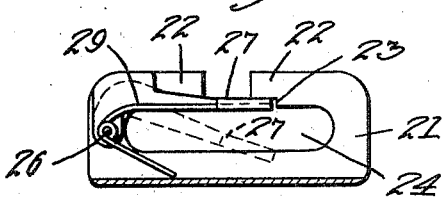
Inventor
Patrick McLoughlin
By Attorneys
Southgate Fay & Hashby Patented Nov. 29, 1927.

1,650,802

UNITED STATES PATENT OFFICE.

PATRICK McLOUGHLIN, OF WORCESTER, MASSACHUSETTS.

SNAP HOOK.

Application filed April 18, 1927. Serial No. 184,654.

This invention relates to a double snap hook capable of general use but particularly adapted for connecting the cross chain to the usual circular chain of an automobile anti-skidding device.

The principal objects of the invention are to provide a form of manufacture which will be inexpensive because easily assembled and in which the frame will be of sheet metal, thus also economizing in the cost of manufacture, and to provide the two latches for the opposite sides of a snap hook in a very compact form in which they are pivoted on the same axis and a single spring is used for operating them, thus therefore reducing the expense of repairs and application.

Other objects and advantages of the invention will appear hereinafter.

Reference is to be had to the accompanying drawings in which

Fig. 1 is a plan view of a double snap hook constructed in accordance with this invention shown as connecting the cross chain to the side chain;

Fig. 2 is a side view;

Fig. 3 is an end view;

Fig. 4 is a plan of the two latches removed from the frame;

Fig. 5 is a side view of them; and

Fig. 6 is an inside view of a modified form showing the frame in section along the back.

In the form shown in the first five figures, the frame of the snap hook consists of a piece of flat sheet metal 10 bent up about the back 11 as a center to form two identical sides. These sides each have a hook end 12 extending inwardly from the end toward the center and parallel with the back. Each of these ends has a notch 13 for a purpose to be described and a space 14 for receiving the chain. The frame 10 is bent into the form shown in Fig. 3 to provide a space near the back for the reception of the other parts and the chain while the ends are brought into contact with each other and either secured in any ordinary way or not as may be desired. Two of these ends are located in contact to form each hook part of the device. The two sides of the frame 10 are prolonged inwardly at the center to form two spaced supports 15 for a pivot stud 16.

On the pivot stud 16 are located two latches 17. Each is provided with a transverse projection 18 for engaging in the notches 13 which have been described. These notches form stops to prevent the latches moving further around than shown in Figs. 2 and 5 and prevent their getting out of position otherwise. It will be understood that the two latches are held between the two projections 15 at the center of the frame which are spaced just far enough apart to receive the two latches and prevent side play. The two latches are held apart by a single spring 19 pivoted to both of them and located between them and always tending to force them apart so that if one is held in stationary position against its notch 13, the other can be forced inwardly, but the spring will react against the stationary one and act to force the moving one back to its position in alignment.

This constitutes a very convenient snap hook in which the two sides are exactly alike and one chain can be swung into one notch 14 and another into the other in a very simple and convenient way as shown in Fig. 1. The edge 20 of each latch is located in an inclined position where the pressure of a chain link backwardly upon it toward the stud 16 will merely hold it more firmly in its latched position against the shoulder 13. The sheet metal frame is made in such a way as to reduce the cost of this frame to its lowest terms and the latch construction is so simple that the assembly is also very inexpensive.

A part of the principles above described can be carried out with a single latch. In this case the frame 21 is almost exactly the same as the frame 10 merely having certain modifications in shape. It has the hook ends 22 which are similar to the hook ends 12 and one of which has a notch 23. The space 24 is practically uniform from end to end and serves the same purposes as the notches 14 in the other case. A stud 26 passes across the sheet metal frame to hold a latch 27 which extends across the space between the ends 22 and engages the stop notch 23 as shown. A spring 29 is coiled on the pin 26, engaging the back of the frame on one side and the bottom of the latch on the other and holds the latch closed with a yielding pressure. This has some of the advantages above set forth but not all of them.

Although I have illustrated and described only two forms of the invention I am aware of the fact that other modifications can be made therein by any person skilled in the art without departing from the scope of the invention as expressed in the claims. Therefore, I do not wish to be limited to all the details of construction herein shown and described, but what I do claim is:

1. As an article of manufacture, a double ended snap hook comprising a frame having a hollow back extending along one edge, the opposite edges of the two sides being brought into contact and having notches on the inner sides of their inner ends, a cross pin supported by the frame, two latches pivoted independently on said cross pin and adapted to engage in said notches, and a spring connecting the two latches and tending to force the two latches apart about the pivot pin as a center.

2. As an article of manufacture, a double ended snap hook comprising a sheet metal frame doubled on itself to form two duplicate sides enclosing a hollow back, said sides having central projections, a cross pin supported by the central projections, two latches pivoted independently on said cross pin, and a single spring connecting the two latches at the side of the pin toward the said back and tending to force the two latches apart about the pivot pin as a center, the edges of said latches which are located within the body of the frame being inclined at such an angle that when force is applied to them from anywhere within the frame by a chain link such force will tend to close them instead of opening them.

3. As an article of manufacture, a snap hook comprising a frame having hooks at its opposite ends and a latch unit consisting of two latches, a single pin on which the two latches are pivoted and a spring connecting said latches to force them apart, said unit being adapted to be assembled by itself and placed in the frame as a single piece.

4. As an article of manufacture, a snap hook formed of a flat piece of sheet metal folded on itself along a longitudinal line at the center and having its two halves substantially identical, the two sides being spaced apart throughout the principal part of their area and forming an open top and an open ended casing in the vicinity of the bend, said sides projecting therefrom, a pivot pin extending across and supported by said projections, rigid latches pivoted on the pivot pin, the sides at their ends projecting upwardly beyond the pivot pin and being in contact along a line parallel with the fold or bend to provide a pair of inwardly extending hook ends, said latches engaging said ends, and a spring for operating the latches.

In testimony whereof I have hereunto affixed my signature.

PATRICK McLOUGHLIN.